United States Patent [19]
Sugihara et al.

[11] Patent Number: 5,266,785
[45] Date of Patent: Nov. 30, 1993

[54] STORAGE MEDIUM PROCESSING SYSTEM

[75] Inventors: Yuji Sugihara; Kyoko Sato, both of Tokyo, Japan

[73] Assignee: Kabushiki Kaisha Toshiba, Kawasaki, Japan

[21] Appl. No.: 841,476

[22] Filed: Feb. 26, 1992

[30] Foreign Application Priority Data

Mar. 30, 1991 [JP] Japan .................................. 3-90990

[51] Int. Cl.$^5$ .............................................. G06F 15/30
[52] U.S. Cl. .................................. 235/384; 235/380; 235/382
[58] Field of Search ..................... 235/380, 382, 384

[56] References Cited

U.S. PATENT DOCUMENTS 4,303,904 12/1981 Chasek .

FOREIGN PATENT DOCUMENTS 0401192 12/1990 European Pat. Off. .
2620551 3/1989 France .
2630562 10/1989 France .
90/03016 3/1990 PCT Int'l Appl. .

Primary Examiner—Harold Pitts
Attorney, Agent, or Firm—Cushman, Darby & Cushman

[57] ABSTRACT

A storage medium processing system includes a radio card, having a data storing function, for reading/writing data by a radio system, a read antenna for transmitting data read request signal to the radio card and for receiving read data, a processing means, having a processing queue area for registering write data in a memory area, for checking the data received from the read antenna and editing the write data, and a write antenna for transmitting the write data to the radio card and receiving write result data. Even when an order of vehicles entering into the booth, i.e., a reception order of vehicle data is not equal to an order to vehicles leaving the booth, i.e., a reception order of processed data, a process of writing the processed data into the radio card can be effected reliably and without omission.

3 Claims, 6 Drawing Sheets

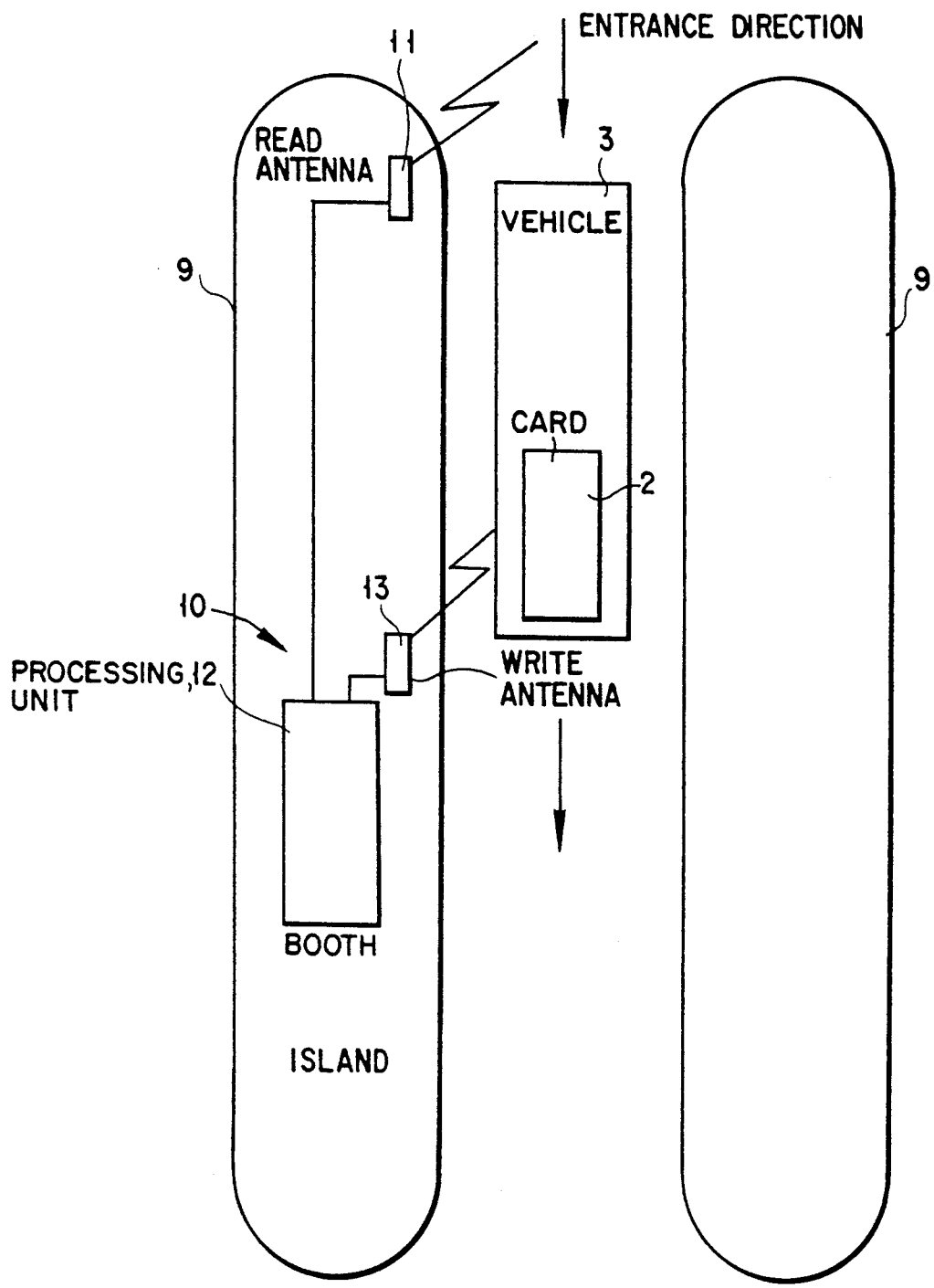
F I G. 2

STORAGE MEDIUM PROCESSING SYSTEM

BACKGROUND OF THE INVENTION

1. Field of the Invention

The present invention relates to a storage medium processing system in which a toll of a vehicle running on a toll road is calculated by using a storage medium.

2. Description of the Related Art

In a conventional system, radio cards serving as storage media are carried on vehicles running on a toll road, and tolls are calculated on the basis of data recorded on the radio cards. In this system, read data from each radio card must be processed in a one-to-one correspondence with write data. That is, in a conventional storage medium processing system, write data for a radio card is generated and transmitted in accordance with an order of formation of read data from radio cards (an order of entrance of vehicles into the booth) at a booth (passage point) which is installed at each main point of a toll road and checks the passage of vehicles, and read resultant data is received from the radio card, thereby completing one cycle of processing. A plurality of vehicles each having a radio card continuously enter the booth, and read data are transmitted to a processing unit of a booth through a read antenna in an order of entrance. In this case, the processing unit processes the read data in this order. The processed data are sent to a write antenna in the same order as the order of entrance and sequentially transmitted to the respective vehicles, and a radio card of each vehicle sends back write result data to the processing unit.

In a conventional storage medium processing system using radio cards, when vehicles pass the write antenna in the same order as an order of passage of the vehicles through the read antenna, the system is normally operated. However, after the processing of the vehicle #1 which firstly enters into the booth is completed, when a motorcycle #3 which thirdly enters into the booth passes the vehicle #2 which secondly enters into the booth and arrives at the write antenna earlier than the vehicle #2, since the card number of a radio card having read data is different from the card number of a radio card having data to be written in a conventional storage medium processing system, the radio card on the motorcycle #3 is not written with data. Thereafter, when the vehicle #2 arrives at the write antenna, the radio card on the vehicle #2 is written with data, and the processing unit attempts to transmit the written data to the motorcycle #3. However, at this time, the motorcycle #3 is out of a valid transmission/reception area, the data of the radio card on the motorcycle #3 cannot be processed. A vehicle #4 which fourthly enters into the booth and passing through the read antenna goes back or turns around and drops out of the line such that the vehicle #4 does not pass by the write antenna, the processing is not completed. As described above, in a conventional storage medium processing system, when an order of vehicles entering into the booth is not equal to an order of vehicles leaving the booth, processing cannot be completed.

SUMMARY OF THE INVENTION

The present invention has been made on the basis of the above circumstances, and has an object to provide a storage medium processing system in which, even when preceding writing processing for radio cards from which data are continuously generated is delayed or not completed, succeeding data processing can be completed without data omissions.

In order to solve the above problem, according to an aspect of the present invention, there is provided a processing system for communicating with storage medium having memory means for storing data including identification code data and transmitting means for transmitting a response signal, comprising: first receiving means for receiving data stored in each of storage medium; means for updating the data received by the first receiving means; means for storing a plurality of updated data updated by the updating means; means for transmitting the updated data stored in the storing means sequentially; second receiving means for receiving the response signal which is transmitted from the storage medium upon reception of the updated data including the same identification code as the identification code stored in the storage medium; means for erasing corresponding updated data from the storing means based on reception of the response signal; and means for controlling the transmitting means so as to transmit the plurality of identification code data and a plurality of amount data repeatedly.

According to another aspect of the present invention, there is provided a processing system for processing amount data received from a plurality of storage medium each of which is carried by a vehicle and stores identification code data, vehicle type code data and amount data, comprising: first receiving means for receiving the identification code data, the vehicle type code data and the amount data from the plurality of storage mediums; means for subtracting a predetermined amount from the amount data in accordance with each of the vehicle type code data received by the first receiving means; means for storing updated amount data obtained by the subtraction of the subtracting means together with the identification code data; means for transmitting sequentially the plurality of identification code data and amount data stored in the storing means; second receiving means for receiving the response signal which is transmitted from the storage medium upon reception of the updated data including the same identification code as the identification code stored in the storage medium; means for erasing corresponding updated data from the storing means based on reception of the response signal; and means for controlling the transmitting means so as to transmit the plurality of identification code data and the plurality of updated amount data repeatedly.

According to still another aspect of the present invention, there is provided a processing system for processing amount data received from a plurality of storage medium each of which is carried by a vehicle and stores identification code data and amount data, comprising: means for receiving the identification code data and the amount data from the plurality of storage medium; means for subtracting a predetermined amount from the amount data; means for storing a plurality of updated amount data obtained by the subtraction of the subtracting means together with the identification code data; means for transmitting sequentially the plurality of identification code data and the amount data stored in the storing means; second receiving means for receiving the response signal which is transmitted from the storage medium upon reception of the updated data including the same identification code as the identification code stored in the storage means; means for erasing corresponding updated data from the storing means based on reception of the response signal; and means for controlling the transmitting means so as to transmit the plurality of identification code data and the updated amount data repeatedly.

The processing means calculates a toll of a vehicle on the basis of read data of a storage medium received from the receiving means and generates write data for the storage medium. The write data are registered in the processing queue of the processing means in an order of formation the write data, sequentially transmitted from the transmitting means to the storage mediums, and written in the storage mediums. When the storage medium within a valid area of the transmitting means receives write data, the storage medium performs writing processing and returns the writing result to the processing means. Even when vehicles arrive at the transmitting means in an order different from an order of arrival of the vehicles at the receiving means, the processing means retrieves write data corresponding to each vehicle from the processing queue to be able to perform writing processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a plan view showing an arrangement of the storage medium processing system according to the present invention;

DETAILED DESCRIPTION OF THE PREFERRED EMBODIMENT

Figure 1:
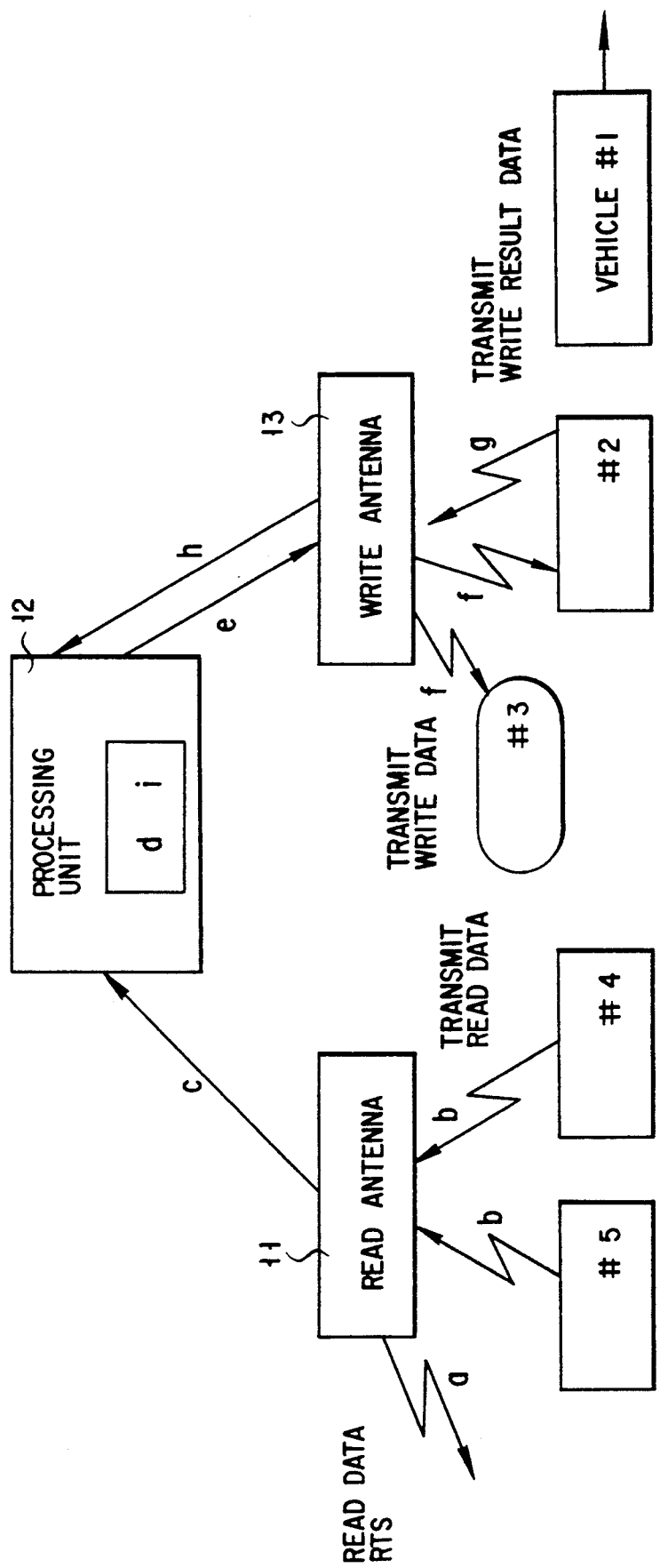
FIG. 1 is a view for explaining the concept of processing steps in a storage medium processing system according to the present invention.

An embodiment of the present invention will be described below with reference to the accompanying drawings.

FIG. 2 is a plan view showing the arrangement of a storage medium processing system 10 according to the present invention. The processing system 10 is a system which is installed in a facility such as a toll road and receives tolls from vehicles running on the toll road. More particularly, in this system, when a vehicle 3 having a radio card 2 serving as a storage medium passes by a read antenna 11 and a write antenna 13, data stored in the radio card are read and written so as to perform a toll payment. The read antenna 11 for a reading operation and a write antenna 13 for a writing operation are arranged on an island 9. The read antenna 11 and write antenna 13 can communicate with the radio card 2 on the vehicle 3 by a radio system. A processing unit 12 is arranged in a booth built in the island 9 of a tollgate. The processing unit 12 is connected to the read antenna 11 and the write antenna 13 to control these antennas and process transmission/reception data.

Figure 3:
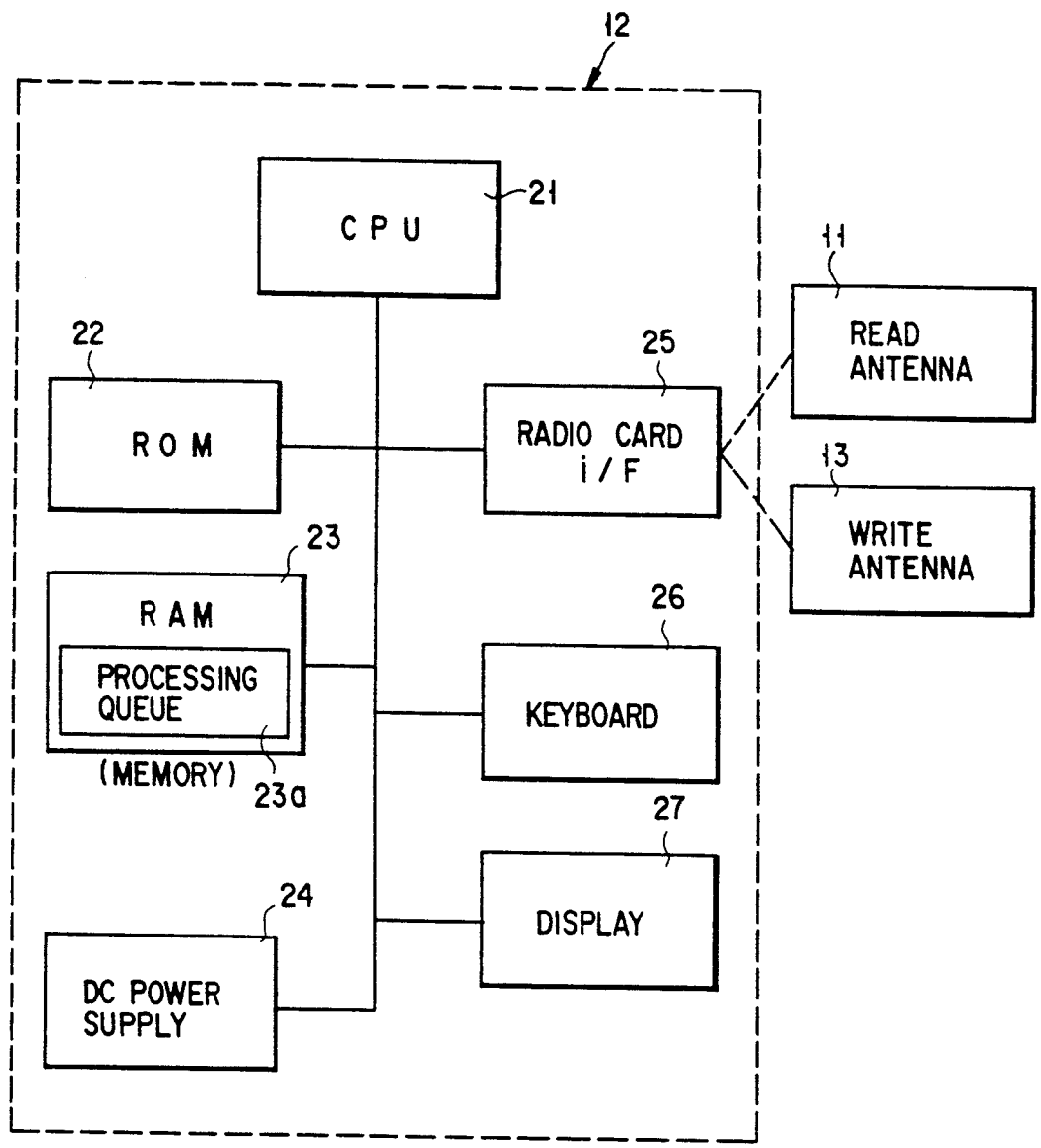
FIG. 3 is a block diagram showing the arrangement of the processing unit in FIG. 2.

FIG. 3 is a block diagram showing an arrangement of the processing unit 12 in FIG. 2. The processing unit 12 is constituted by a CPU 21 for controlling the whole system; a ROM 22 connected electrically to the CPU 21, for storing a control program or the like; a RAM 23, connected electrically to the CPU 21 and having a processing queue, for storing identification code data, vehicle type code data and amount data for each vehicle; a DC power supply 24 for supplying a DC voltage to each element; a radio card interface 25 used for connections between the processing unit 12 and the read antenna 11 and between the unit 12 and the write antenna 13; a keyboard 26 which is connected electrically to the CPU 21 and used for referring to current processing data and designating the start and end of the processing; and a display 27 which is connected electrically to the CPU 21 and used for displaying and confirming processed data which are processed by the CPU 21 or which are inputted from the keyboard 26.

Figures 4A, 4B, 4C, 4D, 4E:
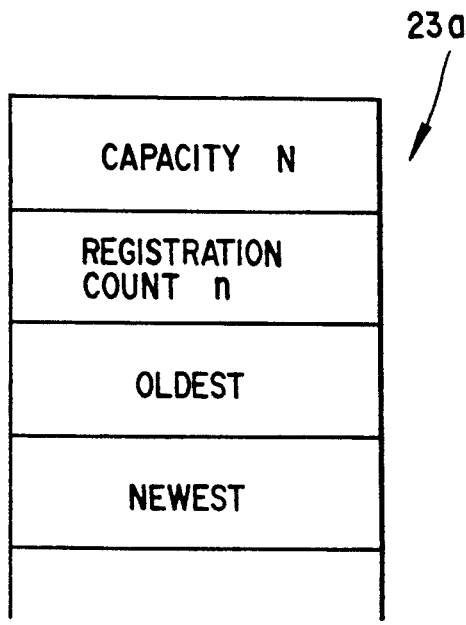
FIG. 4A is a view showing an arrangement of the processing queue in FIG. 3.
FIGS. 4B to 4E are views for explaining an operation of the processing queue.

FIG. 4A to 4E are views showing a processing queue arranged in the RAM 23 in FIG. 3. FIG. 4A shows an arrangement of the processing queue as an example, and FIGS. 4B to 4E explain register states in the processing queue in FIG. 4A. As shown in FIG. 4A, the processing queue is constituted by a capacity N, a registration count n ($n \leq N$), an oldest data number, and a newest data number which are arranged from the top to bottom. In FIGS. 4B to 4E, for descriptive convenience, four data #1 to #4 are registered using four memories. FIG. 4B shows a state of registering no data. FIG. 4C shows a state of registering the data #1, FIG. 4D shows a state of registering all the data #1 to #4. FIG. 4E shows the following state. That is, the data #1 is erased, the data #2 to #4 are registered, and another data can be registered at the position where the data is erased.

An operation of a storage medium processing system according to the present invention will be described below with reference to FIGS. 1, 4A to 4E, 5, and 6.

Figure 5:
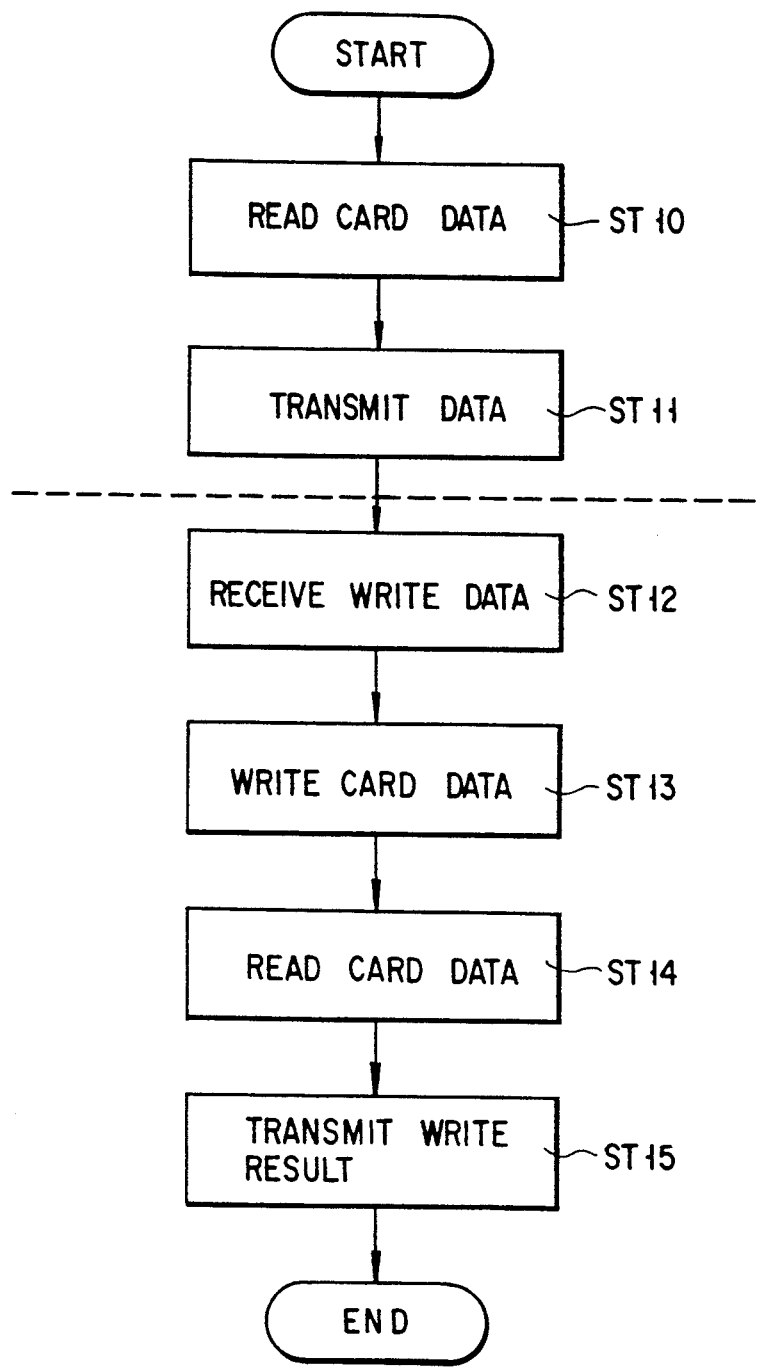
FIG. 5 is a flow chart for explaining a processing order in a storage medium.
Figure 6:
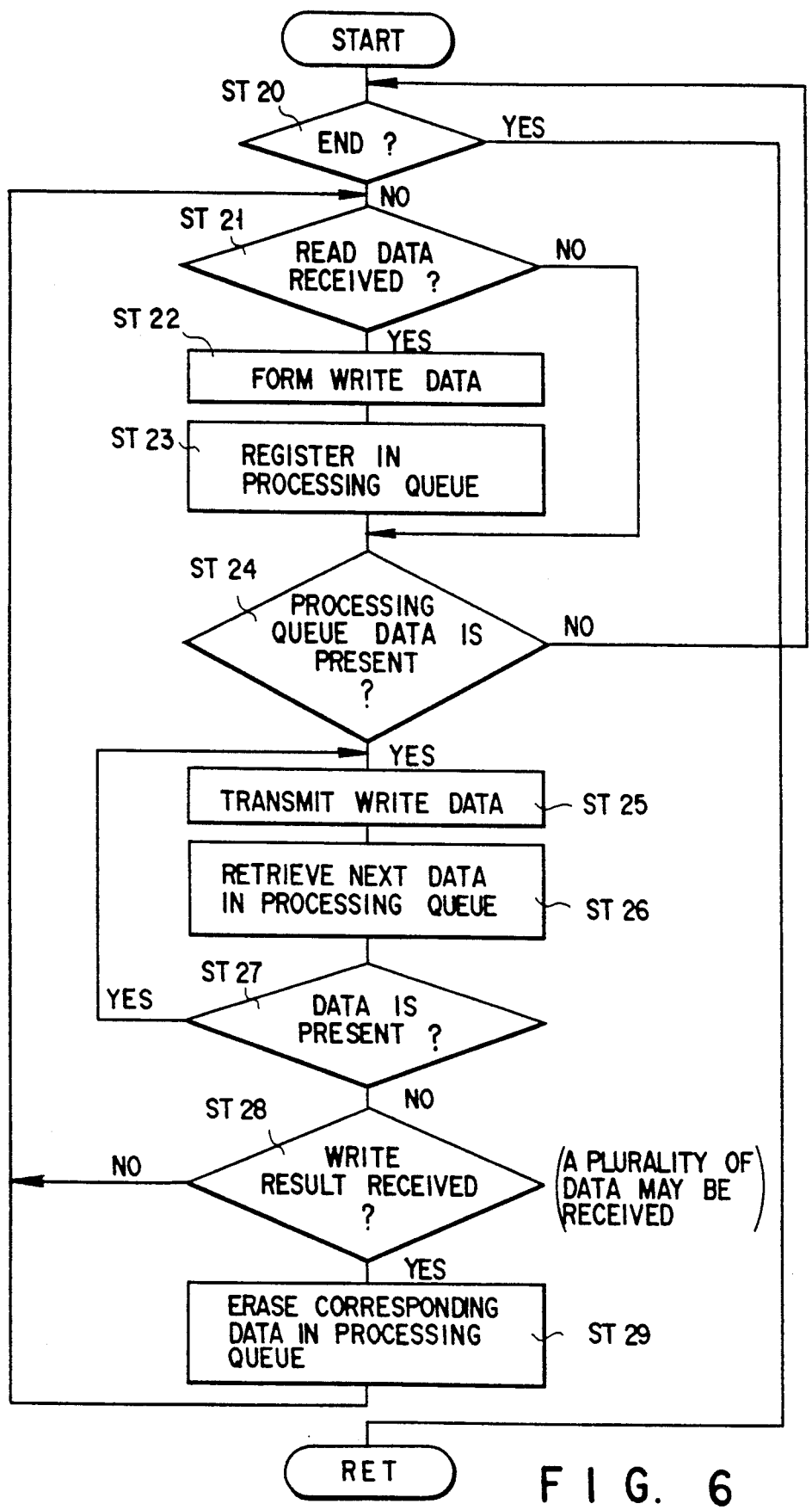
FIG. 6 is a flow chart for explaining a processing order in the processing unit.

FIG. 5 is a flow chart for explaining processing steps in the radio card 12, and FIG. 6 is a flow chart for explaining processing steps in the processing unit 12. The radio card 2 has a memory for storing a unique identification code, cash data (balance), amount (of money) data, past records, and control device for transacting the data stored in the memory. The read antenna 11 polls a read data RTS (ready to send) every predetermined time interval regardless of the processing of the processing unit 12 (indicated by a in FIG. 1). When a vehicle enters into the booth to reach the valid transmission/reception area of the read antenna 11, the radio card 2 carried on the vehicle 3 reads card data such as the balance of the card and previous use information in response to the read data RTS (step ST10 in FIG. 5). The radio card 2 transmits the read data such as the balance to the read antenna 11 (indicated by b in FIG. 1, step ST11 in FIG. 5). The read antenna 11 transmits the read data to the processing unit 12 (indicated by c in FIG. 1). At this time, the processing unit is set in a waiting state (step ST20 in FIG. 6). When the processing unit 12 receives the read data from the antenna 11 (step ST21 in FIG. 6), the processing unit 12 checks the validity/invalidity of the received data to calculate a toll, and the toll is subtracted from the balance of the received data. Thereafter, the processing unit 12 updates the received data to write data, updated balance etc, (indicated by d in FIG. 1, step ST22 in FIG. 6), and the write data is registered in the processing queue arranged in the processing unit 12 (indicated by d in FIG. 1, step ST23 in FIG. 6).

At this time, the processing unit 12 checks whether nonprocessed data which is not registered in the radio card 2 is registered in the processing queue (step ST24 in FIG. 6). In step ST21 in FIG. 6, whether the processing unit 12 has received read data or not, the processing unit 12 always checks whether nonprocessed data is registered. When the nonprocessed data is registered in the processing queue, the processing unit 12 sequentially and repeatedly transmits processing queue data as write data to the write antenna 13 (step ST25 in FIG. 6). The processing unit 12 retrieves processing queue to check whether another nonprocessed data is registered in the processing queue after the processing unit 12 transmits the write data (step ST26 in FIG. 6). When nonprocessed data is present (step ST27 in FIG. 6), the nonprocessed data is transmitted to the write antenna 13 as write data. As long as any nonprocessed data is present, steps ST25, ST26, and ST27 are repeatedly transacted. Immediately after the write antenna 13 receives write data from the processing unit 12, the antenna 13 sequentially transmits the write data to the radio card 2 (indicated by f in FIG. 1).

When the radio card 2 carried by the vehicle receives write data (step ST12 in FIG. 5), the radio card 2 writes the write data in the memory of the card (step ST13 in FIG. 5), reads the written data (step ST14 in FIG. 5), and transmits to the write antenna 13 the write resultant data which indicates the exact writing to the card 2 if the written data coincides with the read data (indicated by g in FIG. 1 and step ST15 in FIG. 5). When the write antenna 13 receives the write resultant data from the radio card 2 located within the valid transmission/reception area, the write antenna 13 transmits the data to the processing unit 12 (indicated by h in FIG. 1).

When the processing unit 12 receives the write result data from the write antenna 13 (step ST28 in FIG. 6, the processing unit 12 compares ID code of the write resultant data with ID code of nonprocessed data in the processing queue. At this time, if there is nonprocessed data corresponding to the write result data, the corresponding nonprocessed data is erased from the processing queue (indicated by i in FIG. 1, step ST29 in FIG. 6). Thus, processing for the processing queue data is completed. Even when an order of arrival of vehicles at the read antenna 11 is different from an order of arrival of the vehicles at the write antenna 13, a writing operation of data can be performed.

In the case where the vehicles arrive at the write antenna in different order from the entrance order into the booth, since data remains in the processing queue, when write result data is not received even when transmission of write data is repeated for a predetermined period of time (i.e., 10 mins) or predetermined number of times, the data may be processed as erroneous data. Hence the data may be erased directly from the processing queue. Otherwise, the data may be erased from the processing queue after the data is stored in another area of RAM 23 as an error data.

The processing unit 12 may have, in addition to the radio card, a payment processing function using cash, coupons, or the like.

As described above, according to the present invention, when data to be processed are continuously generated, even if preceding processing is delayed or not completed, succeeding data processing free from data omissions can be automatically completed without a cumbersome manual correcting operation.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A processing system for communicating with storage medium having memory means for storing data including identification code data and transmitting means for transmitting a response signal, comprising:
    first receiving means for receiving data stored in each of storage medium;
    means for updating said data received by said first receiving means;
    means for storing a plurality of updated data updated by said updating means;
    means for transmitting said updated data stored in said storing means sequentially;
    second receiving means for receiving said response signal which is transmitted from said storage medium upon reception of said updated data including the same identification code as said identification code stored in said storage medium;
    means for erasing corresponding updated data from said storing means based on reception of said response signal; and
    means for controlling said transmitting means so as to transmit said plurality of identification code data and a plurality of amount data repeatedly.

2. A processing system for processing amount data received from a plurality of storage medium each of which is carried by a vehicle and stores identification code data, vehicle type code data and amount data, comprising:
    first receiving means for receiving said identification code data, said vehicle type code data and said amount data from said plurality of storage medium;
    means for subtracting a predetermined amount from said amount data in accordance with each of said vehicle type code data received by said first receiving means;
    means for storing updated amount data obtained by the subtraction of said subtracting means together with said identification code data;
    means for transmitting sequentially said plurality of identification code data and amount data stored in said storing means;
    second receiving means for receiving said response signal which is transmitted from said storage medium upon reception of said updated data including the same identification code as said identification code stored in said storage medium;

means for erasing corresponding updated data from said storing means based on reception of said response signal; and means for controlling said transmitting means so as to transmit said plurality of identification code data and said plurality of updated amount data repeatedly.

3. A processing system for processing amount data received from a plurality of storage medium each of which is carried by a vehicle and stores identification code data and amount data, comprising:

means for receiving said identification code data and said amount data from said plurality of storage medium;

means for subtracting a predetermined amount from said amount data;

means for storing a plurality of updated amount data obtained by the subtraction of said subtracting means together with said identification code data;

means for transmitting sequentially said plurality of identification code data and said amount data stored in said storing means;

second receiving means for receiving said response signal which is transmitted from said storage medium upon reception of said updated data including the same identification code as said identification code stored in said storage medium;

means for erasing corresponding updated data from said storing means based on reception of said response signal; and means for controlling said transmitting means so as to transmit said plurality of identification code data and said updated amount data repeatedly.

* * * * *